Patented Nov. 22, 1949

2,489,151

UNITED STATES PATENT OFFICE 2,489,151

PREPARATION OF DINITROPARAFFINS

Edwin M. Nygaard, Woodbury, N. J., and John H. McCracken, Cumberland, Md., assignors to Socony-Vacuum Oil Company, Incorporated, a corporation of New York No Drawing. Application December 7, 1945, Serial No. 633,552

4 Claims. (Cl. 260—644)

This invention has to do with a new method for the preparation of gem-dinitroparaffins, and more particularly, has to do with a new method for the preparation of those gem-dinitroparaffins which are characterized by attachment of both nitro groups to a secondary carbon atom.

In the past several attempts have been made to prepare gem-dinitroparaffins of the type represented by the following general formula:

I. 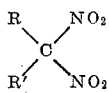

wherein R and R' may be the same or different alkyl groups. All previous attempts, however, have been occasioned by little success inasmuch as the starting materials or reactants were relatively expensive, the yields of the desired products were small, etc. All of such methods proved uneconomical. For example, ter Meer (Liebig's Annalen der Chemie, 181, 1 (1876) and Nef (ibid. 280, 263 (1894)) prepared secondary gem-dinitroparaffins by reaction of an alkyl halide with a silver salt of a primary gem-dinitroparaffin. J. Bredt (Berichte, 15, 2318 (1882)) reported that a small amount of 2,2-dinitropropane was obtained when isovaleric acid was nitrated at 0° C. The same dinitropropane was also prepared in rather small yields by Meyer and Locher (Annalen 180, 133 (1876)) by an oxidation method, chromic acid being used to oxidize propyl pseudonitrole in an acetic acid solution. The highest yield of the aforesaid dinitropropane obtained by Meyer and Locher was 35%; however, they were not able to repeat this performance consistently. Meyer and Locher also reported that a small yield, 17%, of the same dinitropropane was obtained when propyl pseudonitrole was heated near its melting point.

We have now discovered an inexpensive method whereby substantial yields of secondary gem-dinitroparaffins are obtained. Specifically, the present method involves contacting a pseudonitrole with an oxygen-containing gas, i. e., oxygen or air.

As indicated above, one of the initial reactants is a pseudonitrole represented by the general Formula II:

II. 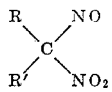

wherein R and R' may be the same or different alkyl groups and may be unsubstituted or substituted with such substituents as halogen, keto, hydroxyl, amino, etc. While all of the pseudonitroles so defined are contemplated for use, propyl pseudonitrole, which is converted by the new oxidation method to 2,2-dinitropropane, is particularly preferred. These reactants may be prepared by any of the methods well known to the art. However, an inexpensive and preferred method is that which is described in Patent No. 2,370,185, issued to applicants and T. T. Noland on February 27, 1945. Inasmuch as propyl pseudonitrole exists in the solid dimeric form and inasmuch as it is preferred to work in a liquid medium, a solvent—in which the dimeric form is converted to the corresponding liquid monomeric form—is used. Among the solvents favoring depolymerization of a pseudonitrole to its monomeric form and which do not react with decomposition products thereof are acetic acid, carbon tetrachloride, benzene, highly aromatic petroleum fractions, dinitropropanes, etc.

It is most desirable to affect the conversion of pseudonitroles to the corresponding gem-dinitroparaffin as rapidly as possible, for the monomeric pseudonitroles are characterized by a tendency to decompose slowly to a ketone and oxides of nitrogen. Accordingly, if the reaction is not carried out at a satisfactory rate, the yield of the desired gem-dinitroparaffin is substantially decreased by virtue of the aforesaid decomposition. Several means have been found to be useful in insuring a rapid reaction; for example, high speed agitation and effectively baffled reaction vessels cooperate to provide a thorough and rapid contacting of the reactants. The reaction is also hastened by certain catalysts, specifically, oil-soluble metal organic compounds—such as those used as paint driers—which promote oxidation. Typical of these compounds are iron, copper and cobalt salts of such organic acids as naphthenic and oleic. Particularly preferred of such catalysts are ferric naphthenate and cobalt "oil-solate," i. e. a cobalt salt of an organic ether acid. Materials such as the latter are described at length in an article by Bruson and Stein in "Industrial and Engineering Chemistry," volume 26, No. 12, pages 1268 to 1271.

Although pure oxygen is preferred in the aforesaid reaction in view of the larger yields obtained therewith, air provides the cheapest source of oxygen. When air is used, however, the reaction rate is somewhat slower than with pure oxygen.

The reaction temperatures used here may be varied from about 20° C. to the decomposition temperature of the pseudonitrole used, and preferably are maintained a few degrees below said decomposition temperature.

In order to illustrate the present invention a typical and preferred gem-dinitroparaffin—2,2-dinitropropane—was prepared as described in detail in the following examples. The apparatus used in these illustrative examples involved a three-necked reaction flask equipped with a mercury sealed, 1750 R. P. M. electrically-driven stirrer and a 1000 cc. glass burette. A three-way stopcock was attached to the top of the glass burette and a levelling bulb was attached to the bottom of the burette. One arm of the stopcock was connected to the reaction flask and another arm was connected to the oxygen supply.

*Example 1*

Twenty-four parts by weight of propyl pseudonitrole, 0.1 per cent by weight of ferric naphthenate and 132 parts by weight of benzene were added to a reaction flask of the type described above, and oxygen was admitted through one arm of the stopcock at 20 mm. mercury pressure (780 mms.). At the end of twenty hours, with a reaction temperature of 20–25° C., the reaction was nearly complete. At the end of forty hours the reaction was finished. The benzene solution was then extracted 4 times with small quantities of water. On distillation the aqueous extract yielded 1.5 parts by weight of acetone, a 13% yield. The benzene solution was evaporated and the residue remaining after evaporation was steam distilled. The yield of crude product was 9 parts by weight, or 33% of the theoretical yield. By distillation with water through a 6 plate fractionating column it was found that at least 0.1 part by weight of 2,3-dimethyl-2,3-dinitrobutane (0.6 per cent by weight of the starting material) contaminated the 2,2-dinitropropane obtained as the main product.

*Example 2*

Two parts by weight of propyl pseudonitrole, 0.1% by weight of cobalt oilsolate (containing 11.5 per cent by weight of cobalt) and a mixture of 74 parts by weight of a highly aromatic petroleum fraction boiling at 194–272° F. and 39 parts by weight of a similar petroleum fraction boiling at 190–285° F. were added to a reaction flask of the type described above. Oxygen was introduced as indicated above for 8 hours, with the temperature maintained at 20° C., after which time a stream of oxygen was discontinued and the system was filled with nitrogen. About 2½ additional 8-hour periods, during which oxygen was introduced, were required to complete the oxidation, although the oxidation was substantially complete at the end of the second period, namely, a total of 16 hours. The total oxygen absorption was equivalent to 1.7 atoms of oxygen per mol of pseudonitrole. The rate at which oxygen was introduced was 2340 cc. per mol per hour, as measured from the fiftieth to the hundredth cc. The reaction mixture so obtained was worked up as described in Example 1 whereupon 2,2-dinitropropane was isolated.

*Example 3*

Three parts by weight of propyl pseudonitrole, 88 parts by weight of benzene and 0.1% by weight of ferric naphthenate (based on the propyl pseudonitrole) dissolved in a small amount of benzene, were added to the aforesaid reaction flask. Prior to measuring the oxygen introduced into the reaction flask the system was flushed with oxygen. The absorption was stopped over night by filling the system with nitrogen. After three 8-hour periods during which oxygen was introduced, the characteristic blue color of the monomeric pseudonitrole had faded to a blue green and absorption of oxygen had practically ceased. An additional 20 hours was required for the absorption of the final 3 per cent of the total oxygen absorbed. The total absorption of oxygen amounted to 1.7 atoms of oxygen per mol of pseudonitrole. The rate at which oxygen was introduced was 1240 cc. per mol of pseudonitrole per hour, as measured from the fiftieth to the hundredth cc. The temperature throughout the preparation varied from 18° C. to 21° C. Benzene was removed as described above and the yield of 2,2-dinitropropane was about 30%. A trace of 2,3-dimethyl-2,3-dinitrobutane was found in the reaction mixture.

*Example 4*

Two parts by weight of propyl pseudonitrole in glacial acetic acid solution were subjected to the procedure described in Example 3, the temperature being maintained at about 20° C. The absorption was practically complete in three 8-hour periods; and he total absorption amounted to 1.2 atoms of oxygen per mol of pseudonitrole. The rate at which oxygen was introduced was 950 cc. per mol per hour, as measured from the fiftieth to the hundredth cc. The reaction mixture was water washed to remove glacial acetic acid and thereby isolate 2,2-dinitropropane.

It will be apparent from the foregoing illustrative examples that the present method is a valuable means for preparing secondary gem-dinitroparaffins. As is well known to those familiar with the chemical art, such compounds are valuable intermediates in chemical synthesis; and recently these compounds have been found to be extremely effective ignition improvers in Diesel type fuels.

Although the present invention has been illustrated hereinabove by the preparation of a specific secondary gem-dinitroparaffin and has been illustrated by specific procedures, it is to be understood that these are but preferred embodiments of the new method for the preparation of secondary gem-dinitroparaffins. The present invention, however, is not to be construed as limited thereto, but is to be broadly construed in the light of the defining language of the appended claims.

We claim:

1. The method of preparation of a gem-dinitroparaffin having both nitro groups attached to a secondary carbon atom, which comprises reacting a secondary alkyl pseudonitrole with a gas consisting essentially of free oxygen, in the presence of a catalytic amount of an oil-soluble, metal organic compound selected from the group consisting of ferric naphthenate and cobalt salts of organic ether acids; and separating said dinitroparaffin from the reaction mixture obtained in the preceding operation.

2. The method of preparation of 2,2-dinitropropane which comprises reacting propyl pseudonitrole, in benzene, with oxygen in the presence of a catalytic amount of ferric naphthenate; and separating said dinitropropane from the reaction mixture obtained in the preceding operation.

3. The method of preparation of 2,2-dinitropropane which comprises reacting propyl pseudonitrole, in acetic acid, with oxygen in the presence of a catalytic amount of ferric naphthenate;

and separating said dinitropropane from the reaction mixture obtained in the preceding operation.

4. The method of preparation of 2,2-dinitropropane which comprises reacting propyl pseudonitrole, in a highly aromatic petroleum fraction, with oxygen in the presence of a catalytic amount of a cobalt salt of an organic ether acid; and separating said dinitropropane from the reaction mixture obtained in the preceding operation.

EDWIN M. NYGAARD.
JOHN H. McCRACKEN.

REFERENCES CITED

The following references are of record in the file of this patent:

Born: "Berichte deutsche Chem. Gesell.," vol. 29, (1896), pages 93–101.

Rheinboldt: "Berichte deutsche Chem. Gesell.," vol. 60 (1927), pages 250–251.

Scholl: "Berichte deutsche Chem. Gesell.," vol. 23 (1890), pages 3490–3495.

Meyer et al.: "Liebig's Annalen," vol. 180 (1875), pages 144 and 147.

Charlton: "Jour. Chem. Soc." (London), 1932, page 36.